US009309903B2

(12) United States Patent
Clingman et al.

(10) Patent No.: US 9,309,903 B2
(45) Date of Patent: Apr. 12, 2016

(54) VORTEX GENERATORS

(71) Applicant: The Boeing Company, Chicago, IL (US)

(72) Inventors: Dan John Clingman, Milton, WA (US); Esther Shifra Zidovetzki, Seattle, WA (US); Randy Lee Macaraeg Mallari, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 251 days.

(21) Appl. No.: 14/042,443

(22) Filed: Sep. 30, 2013

(65) Prior Publication Data

US 2015/0090356 A1   Apr. 2, 2015

(51) Int. Cl.
*F15D 1/00* (2006.01)
*B64C 23/00* (2006.01)
*B64C 23/06* (2006.01)

(52) U.S. Cl.
CPC .............. *F15D 1/009* (2013.01); *B64C 23/005* (2013.01); *B64C 23/06* (2013.01); *Y10T 137/2087* (2015.04)

(58) Field of Classification Search
CPC ................................ F15D 1/009; B64C 23/06
USPC ............ 137/808, 809; 244/130, 199.1, 200.1, 244/201, 203, 204.1
See application file for complete search history.

(56) References Cited

U.S. PATENT DOCUMENTS

| 7,681,290 | B2 | 3/2010 | Clingman et al. |
| 8,047,233 | B2 | 11/2011 | Clingman |
| 2007/0221789 | A1 | 9/2007 | Lee et al. |
| 2009/0120205 | A1 | 5/2009 | Clingman |
| 2010/0038492 | A1 | 2/2010 | Sclafani et al. |
| 2011/0110777 | A1 | 5/2011 | Abdallah et al. |
| 2011/0164976 | A1 | 7/2011 | Matalanis et al. |

FOREIGN PATENT DOCUMENTS

| EP | 2316732 | 5/2011 |
| WO | WO2009080316 | 7/2009 |

OTHER PUBLICATIONS

European Patent Office, "Extended European Search Report," issued in connection with European patent application No. 14185895.1, on Feb. 3, 2015, 7 pages.
Osborn et al., "Active Flow Control Using High-Frequency Compliant Structures," May-Jun. 2004, 7 pages, vol. 41, No. 3, U.S. Airforce Research Laboratory, Wright-Patterson Air Force Base, Ohio.
Barth et al., "Flow Control by Dynamic Vane Vortex Generators Based on Piezoceramic Actuators," May 2011, 11 pages, vol. 49, No. 5, DLR, German Aerospace Center, Germany.
Barrett et al., "Subsonic Aerodynamics and Performance of a Smart Vortex Generator System," Mar.-Apr. 1996, 6 pages, vol. 33, No. 2, University of Kansas, Lawrence, Kansas.
"Active Flow Control Improves Flow Attachment," 2006, 1 page, FlexSys Inc.
Le Pape et al., "Experimental Study of Dynamic Stall Control using Deployable Leading-Edge Vortex Generators," presented at the 67th Annual Forum of the American Helicopter Society, (May 3-5, 2011, Virginia Beach, VA), Abstract provided, 1 page.

*Primary Examiner* — Craig Schneider
*Assistant Examiner* — Paul Gray
(74) *Attorney, Agent, or Firm* — Hanley, Flight & Zimmerman, LLC.

(57) ABSTRACT

Vortex generators are disclosed herein. An example apparatus includes a housing including a surface. The example apparatus also includes a bimorph actuator disposed in the housing. The bimorph actuator includes a first bimorph beam having a first portion fixed relative to the surface. A blade is rotatably coupled to the bimorph actuator, and the bimorph actuator is to rotate the blade to extend a portion of the blade through the surface to generate a vortex in a fluid flowing past the surface.

17 Claims, 11 Drawing Sheets

VORTEX GENERATORS

FIELD OF THE DISCLOSURE

This disclosure relates generally to controlling fluid flow adjacent to a surface and, more particularly, to vortex generators.

BACKGROUND

Fluid flow adjacent to a surface may separate from the surface and produce drag. Traditionally, blades are fixed to the surface and extend into a boundary layer of the fluid flow to generate vortexes in the fluid flow. The vortexes draw fluid outside the boundary layer of the fluid flow toward the surface. As a result, separated fluid flow is reattached to the surface and/or separation of the fluid flow is reduced and/or delayed.

SUMMARY

An example apparatus includes a housing having a surface. The example apparatus also includes a bimorph actuator disposed in the housing. The bimorph actuator includes a first bimorph beam having a first portion fixed relative to the surface. A blade is rotatably coupled to the bimorph actuator, and the bimorph actuator is to rotate the blade to extend a portion of the blade through the surface to generate a vortex in a fluid flowing past the surface.

Another example apparatus includes a blade and a bimorph actuator operatively coupled to the blade. The bimorph actuator includes a fixed portion and a movable portion to enable deflection of the bimorph actuator to rotate the blade. The blade in a first position is to define a portion of a surface, and the blade in a second position is to generate a vortex in a fluid adjacent the surface.

Another example apparatus includes a bimorph actuator disposed in a housing defining a surface. The bimorph actuator has a first portion substantially stationary relative to the surface. The example apparatus also includes a blade operatively coupled to the bimorph actuator. Deflection of the bimorph actuator is to extend or retract the blade relative to the surface. An edge of the blade is to be in a first orientation relative to the surface when the blade is retracted, and the edge of the blade is to be in a second orientation relative to the surface when the blade is deployed.

The features, functions and advantages that have been discussed can be achieved independently in various examples or may be combined in yet other examples further details of which can be seen with reference to the following description and drawings.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

An example vortex generator disclosed herein includes a bimorph actuator operatively coupled to a blade. The bimorph actuator may be disposed in a housing defining a surface of an airfoil. When the bimorph actuator is energized, the bimorph actuator moves the blade from a retracted position to a deployed position. When the blade is in the deployed position, the blade extends into and/or through a boundary layer of a fluid flowing past and/or adjacent to the surface to generate vortexes in the fluid. As a result, the example vortex generators prevent, reduce and/or delay separation of fluid flow from the surface and, thus, improve an aerodynamic performance of the surface by, for example, decreasing drag, mitigating stall phenomena, and/or improving an aerodynamic performance of the surface in other ways.

In some examples, the blade is in a first orientation when the blade is in the retracted position, and the blade is in a second orientation when the blade is in the deployed position. For example, an edge of the blade may be substantially flush with the surface when the blade is in the retracted position, and the edge may be angled away from the surface when the blade is in the deployed position. In some examples, the blade substantially fills a slot defined by the surface when the blade is in a retracted position, when the blade is in the deployed position and when the blade is positioned and/or moving between the retracted position and the deployed position.

In some examples, the bimorph actuator includes a first bimorph beam and a second bimorph beam. In some examples, the blade is rotatably coupled to the first bimorph beam and the second bimorph beam via a crank assembly. When the bimorph actuator is energized, the first bimorph beam and the second bimorph beam bend or deflect to drive the crank assembly to rotate the blade to and from the retracted position and/or the deployed position. In some examples, the first bimorph beam and the second bimorph beam each include a fixed portion and a movable portion. The fixed portions may be substantially stationary relative to the surface, and the moveable portions may be movable relative to the surface to enable deflection such as, for example, bowing of the first bimorph beam and the second bimorph beam when the bimorph actuator is energized.

Figure 1:
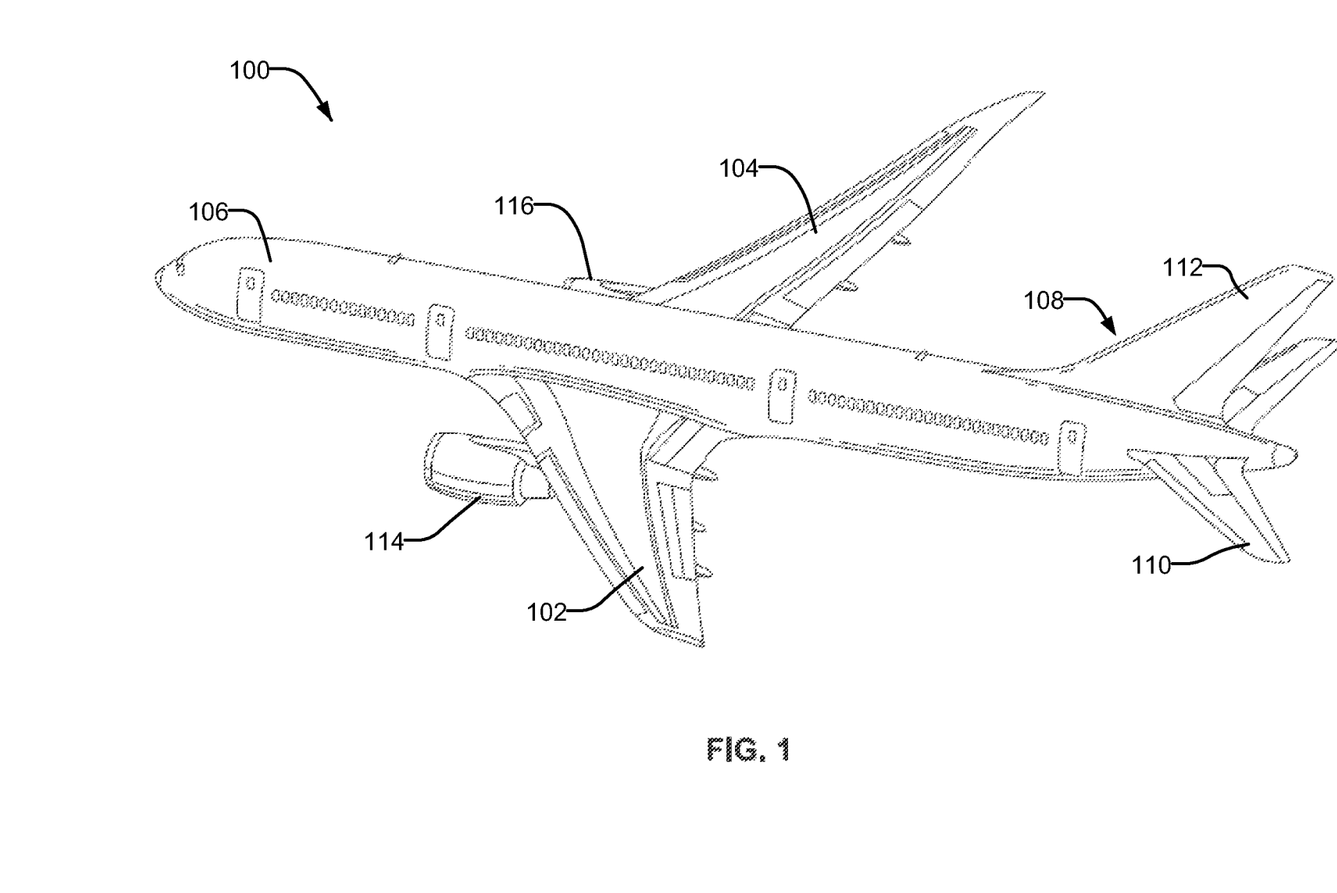
FIG. 1 is a perspective view of an example aircraft, which may be used to implement the example vortex generators disclosed herein.

FIG. 1 is a perspective view of an example aircraft 100 in which aspects of the present disclosure may be implemented. The example aircraft 100 of FIG. 1 includes a first wing 102, a second wing 104 and a fuselage 106. The example aircraft 100 also includes an empennage 108 having a horizontal stabilizer 110 and a vertical stabilizer 112. In the illustrated example, the aircraft 100 includes a first engine 114 and a second engine 116. As described in greater detail below in conjunction with FIGS. 2-10, the example aircraft 100 employs example vortex generators disclosed herein, which generate vortexes adjacent one or more aerodynamic or airfoil surfaces of the aircraft 100. However, the aircraft 100 of FIG. 1 is merely an example and, thus, other aircrafts may be used without departing from the scope of this disclosure. Further, while the following examples are described in conjunction with the example aircraft 100 of FIG. 1, the example vortex generators disclosed herein may be used to generate vortexes in fluid flowing adjacent any surface. For example, the vortex generators may be used to generate vortexes adjacent a surface of a turbine blade, a ship, an automobile and/or a truck, a rotor, etc.

Figure 2:
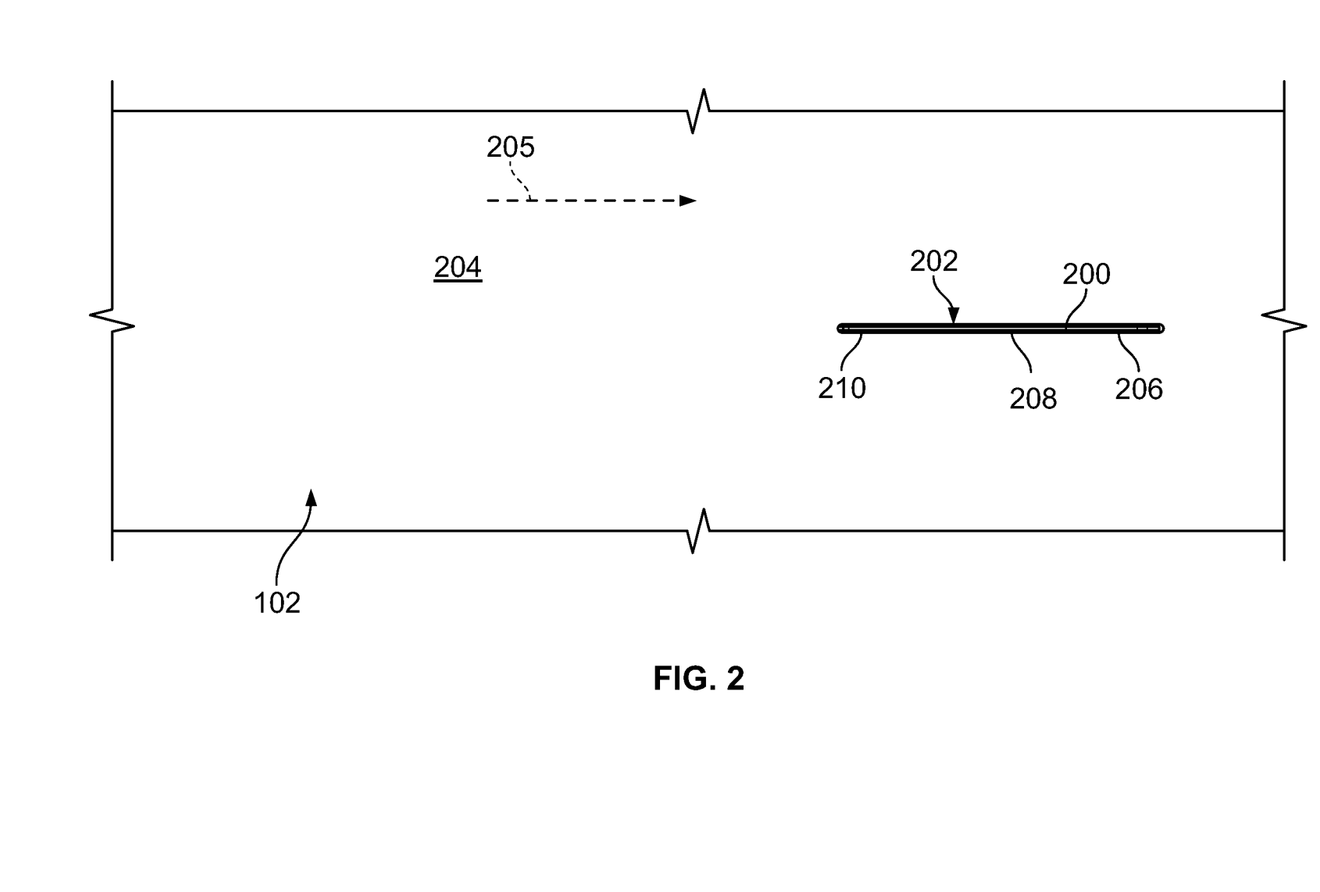
FIG. 2 is a top view of a wing of the example aircraft of FIG. 1, illustrating a blade of an example vortex generator disclosed herein.

FIG. 2 is a top view of the example first wing 102 of the aircraft 100 of FIG. 1, illustrating a blade 200 of an example vortex generator 202 and an aerodynamic surface 204 (e.g., skin) of the first wing 102. The example blade 200 of FIG. 2 is substantially parallel to a direction of flow 205 of fluid (e.g., air) adjacent the surface 204. While the example first wing 102 is illustrated as having one example vortex generator 202 and/or blade 200, other examples include a plurality of vortex generators and/or blades. For example, the first wing 102 may include a row of blades, a symmetrical and/or an asymmetrical array of blades and/or blades arranged in any other pattern to generate vortexes in the fluid flowing adjacent any portion(s) of the surface 204.

In the illustrated example, the blade 200 is in a retracted position. When the example blade 200 is in the retracted position, the blade 200 has a first orientation and substantially fills an aperture or first slot 206 defined by the surface 204. In the illustrated example, a first edge 208 of the blade 200 in the retracted position is substantially flush with and/or level with the surface 204. In some examples, a shape of the first edge 208 corresponds to a shape of the surface 204. For example, in some examples, the surface 204 is substantially planar and the first edge 208 is substantially planar. In some examples, the surface 204 and the first edge 208 are curved and have substantially identical curvatures. As a result, when the example blade 200 is in the retracted position, the first edge 208 substantially forms a portion of the surface 204 and, thus, defines a portion of an airfoil of the first wing 102. In some examples, when the example blade 200 is in the retracted position, an amount of drag produced by the vortex generator 202 is negligible. As described in greater detail below, the blade 200 may be oscillated between the retracted position and a deployed position to enable the vortex generator 202 to generate vortexes in the fluid flowing adjacent the surface.

In some examples, the blade 200 substantially fills the first slot 206 such that a gap 210 of five millimeters or less is present between the blade 200 and the surface 204 when the blade 200 is in the retracted position. As a result, the example blade 200 substantially obstructs the first slot 206 and prevents debris such as, for example, ice, dirt, etc. from entering the first wing 102 via the first slot 206. The above-noted dimension of the first slot 206 is merely an example and, thus, other dimensions may be used without departing from the scope of this disclosure.

In some examples, a size of the first slot 206 is based on an experimentally determined slot. For example, in some examples, the blade 200 is pushed and/or punched through a curable structure such as, for example, an epoxy wall. The example blade 200 is then removed, and a size of an opening made in the structure is measured to determine the size of the first slot 206. In some examples, instead of using the curable structure to determine measurements, the curable structure is employed on the example first wing 102. For example, the first wing 102 may be constructed with an aperture larger than the first slot 206. The example aperture is substantially filled with a curable substance such as, for example, an epoxy, and the blade 200 is punched through the substance to form the first slot 206.

In the illustrated example, the first wing 102 houses the example vortex generator 202. However, the first wing 102 is merely an example. In other examples, the example vortex generator 202 is disposed in other housings such as, for example, a turbine blade, a vehicle wall (e.g., a roof of a trailer of a truck), and/or any structure defining at least a portion of an aerodynamic surface and/or an airfoil.

Figure 3:
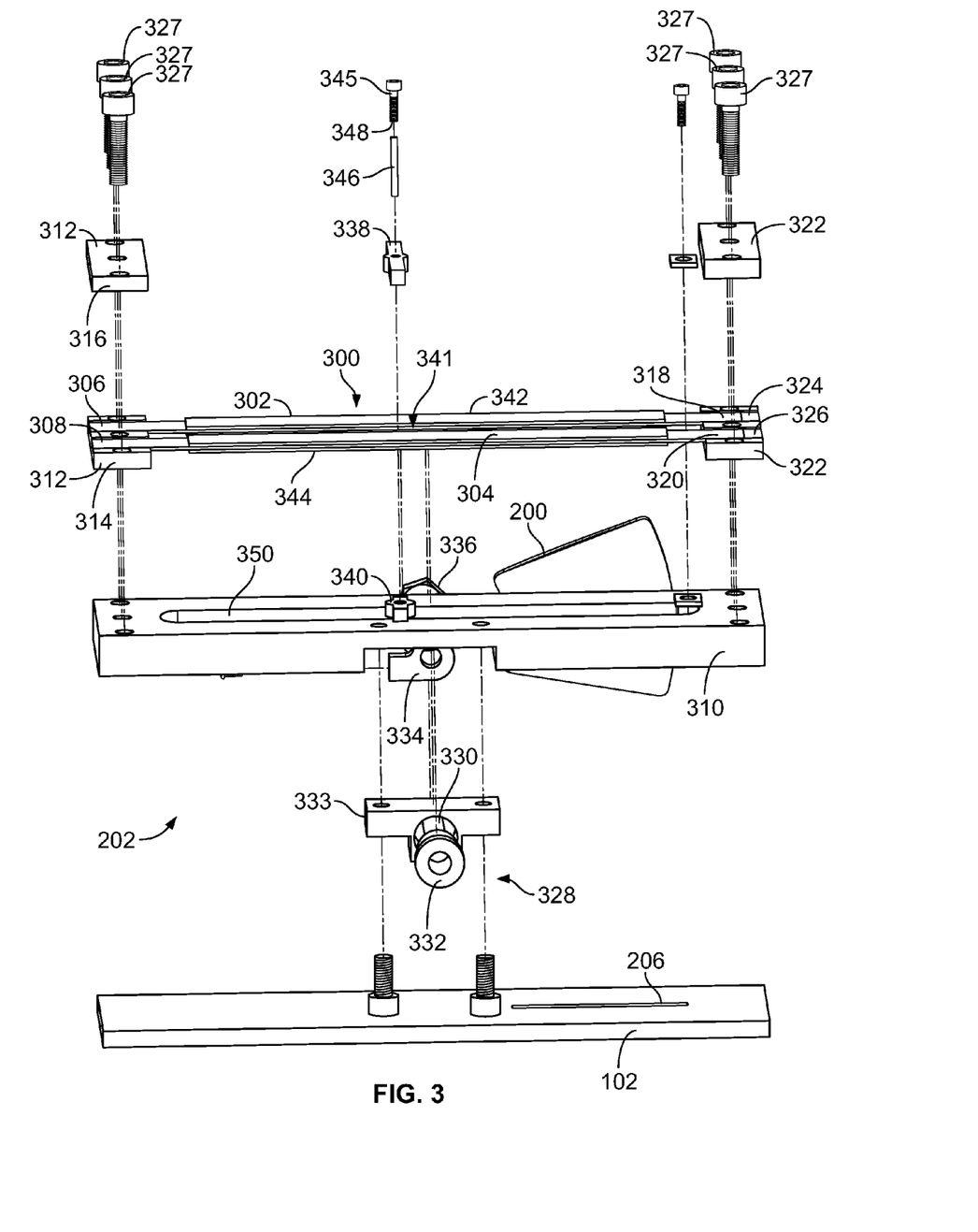
FIG. 3 is an exploded view of the example vortex generator of FIG. 2
Figure 4:
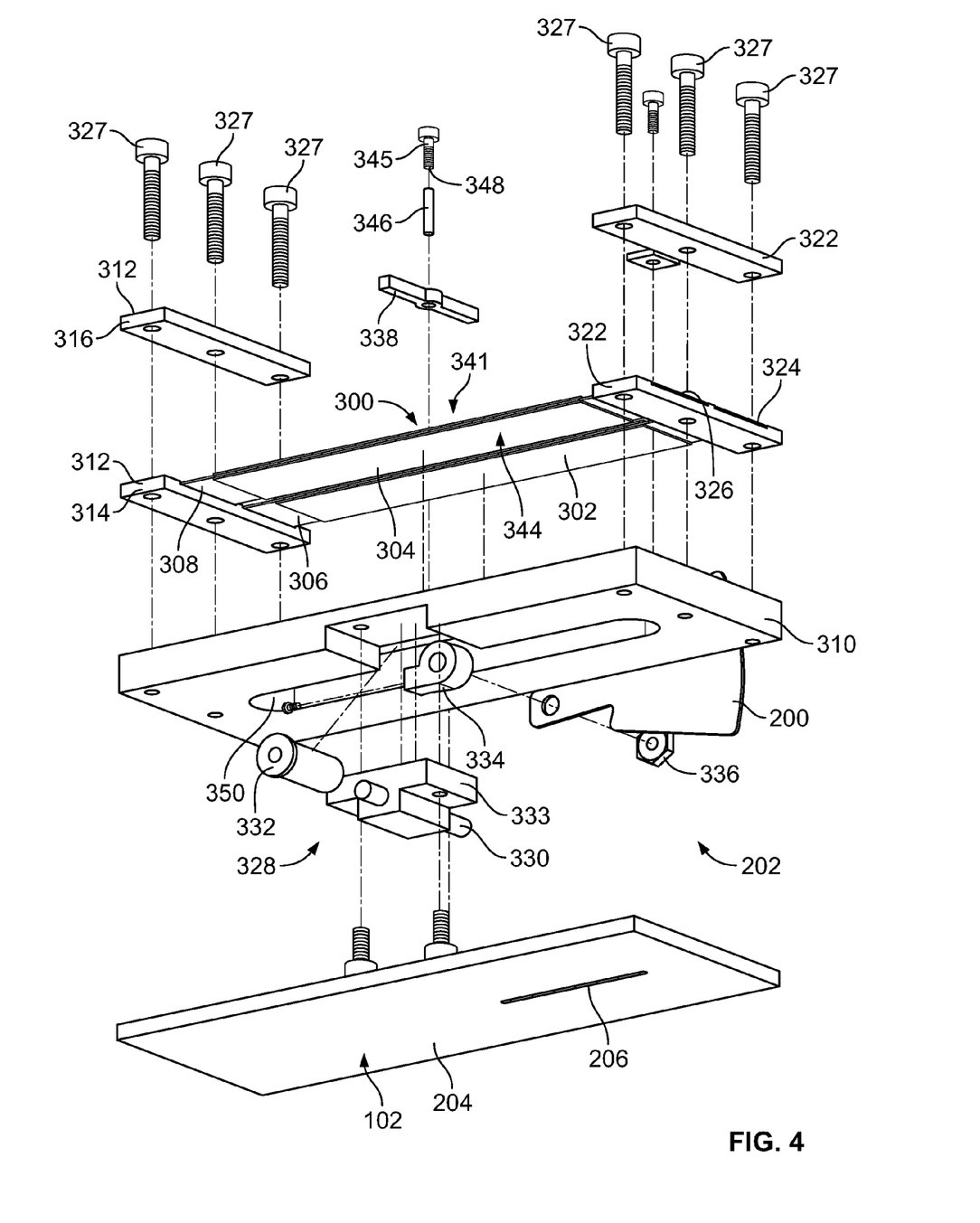
FIG. 4 is another exploded view of the example vortex generator of FIGS. 2-3.
Figure 5:
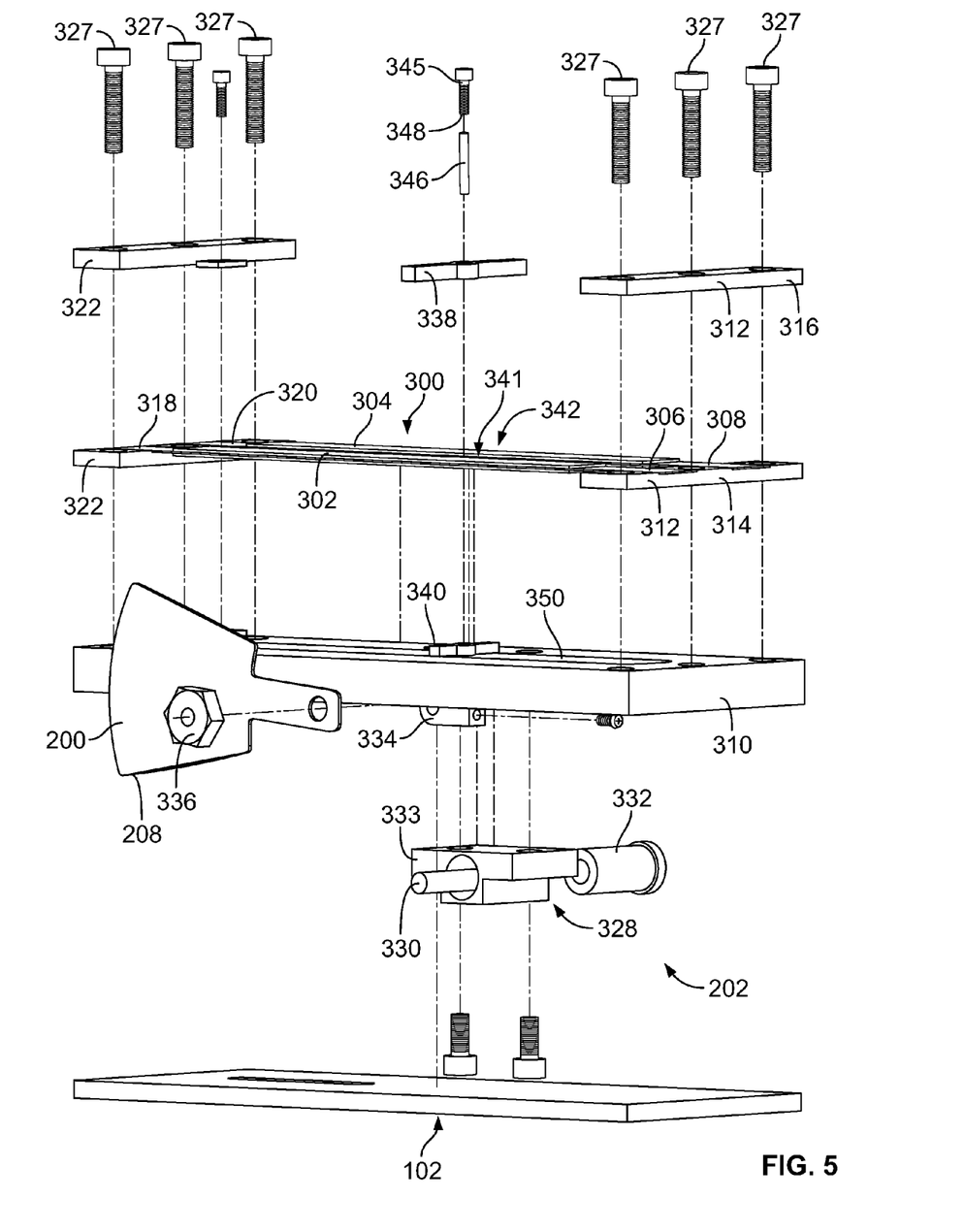
FIG. 5 is another exploded view of the example vortex generator of FIGS. 2-4.

FIGS. 3-5 are exploded views of the example vortex generator 202 of FIG. 2. In the illustrated example, the vortex generator 202 includes a bimorph actuator 300 having a first bimorph beam 302 and a second bimorph beam 304. In the illustrated example, when the bimorph actuator 300 is energized, the first bimorph beam 302 and the second bimorph beam 304 bend or deflect. In the illustrated example, the first bimorph beam 302 and the second bimorph beam 304 have first ends 306, 308 fixedly coupled to a base 310 via a first support 312. More specifically, in the illustrated example, the first ends 306, 308 of the first bimorph beam 302 and the second bimorph beam 304 are clamped between a first portion 314 and a second portion 316 of the first support 312, and the first portion 314 is coupled to the base 310. In other examples, the first ends 306, 308 are fixedly coupled to the base 310 in other ways. In some examples, the base 310 is fixedly coupled to the first wing 102 and, thus, the first ends 306, 308 of the first and second bimorph beams 302, 304 are fixed or substantially stationary relative to the first wing 102 and/or the surface 204.

Second ends 318, 320 of the example first bimorph beam 302 and the example second bimorph beam 304 are supported by and slidably coupled to the base 310 via a second support 322. In the illustrated example, the second support 322 defines a first channel 324 and a second channel 326. In the illustrated example, the second ends 318, 320 of the first bimorph beam 302 and the second bimorph beam 304 are disposed in the first channel 324 and the second channel 326, respectively. The example first channel 324 and the example second channel 326 enable translational movement of the second ends 318, 320 relative to the second support 322. In some examples, the first channel 324 and the second channel 326 guide the translational movement of the second ends 318, 320 and facilitate bending of the first bimorph beam 302 and the second bimorph beam 304. In some examples, the first channel 324 and the second channel 326 reduce and/or substantially prevent twisting of the first bimorph beam 302 and the second bimorph beam 304, respectively. Thus, the example first bimorph beam 302 and the example second bimorph beam 304 may bow. In the illustrated example, the first support 312 and the second support 322 are coupled to the base 310 via fasteners 327. The example fasteners 327 of FIGS. 3-5 are bolts. In other examples, other types of fasteners such as, for example, screws, adhesives, welds, etc. are employed.

When the example bimorph actuator 300 is energized via a first electrical signal, the example first bimorph beam 302 and the example second bimorph beam 304 bend or deflect away from the first wing 102 from an unactuated position to an actuated position. If the example bimorph actuator 300 is then de-energized (e.g., if transmission of the first electrical signal is ceased), the example first bimorph beam 302 and the example second bimorph beam 304 returns to the unactuated position. If a second electrical signal is supplied to the example bimorph actuator 300, the first bimorph beam 302 and the example second bimorph beam 304 bend or deflect toward the first wing 102. In other examples, the bimorph actuator 300 actuates in other ways.

In the illustrated example, the first support 312 is spaced apart from the second support 322, and the first bimorph beam 302 and the second bimorph beam 304 bridge the first support 312 and the second support 322. The example first bimorph beam 302 and the example second bimorph beam 304 are spaced apart from the base 310 via the first support 312 and the second support 322. As a result, when the bimorph actuator 300 actuates, the first bimorph beam 302 and the second bimorph beam 304 bend or deflect without contacting the base 310.

In the illustrated example, the blade 200 is rotatably coupled to the bimorph actuator 300 via a crank assembly 328. In the illustrated example, the crank assembly 328 includes a shaft 330 supported via a bearing 332 disposed in a bearing housing 333. The example bearing housing 333 is coupled to the base 310. The example shaft 330 is coupled to a bell crank 334 and the blade 200. The example blade 200 of FIGS. 3-5 is secured to the crank assembly 328 via a nut 336. In some examples, a position sensor is operatively coupled to the crank assembly 328 to monitor a position of the blade 200.

In the illustrated example, a first tie 338 and a second tie 340 are coupled to the bimorph actuator 300 between the first ends 306, 308 and the second ends 318, 320 of the first bimorph beam 302 and the second bimorph beam 304. In some examples, the first tie 338 and the second tie 340 are coupled to a middle portion 341 of the bimorph actuator 300. The example middle portion of the bimorph actuator 300 is substantially equidistant to the first ends 306, 308 and the second ends 318, 320. In other examples, the first tie 338 and the second tie 340 are coupled to other portions of the bimorph actuator 300. In the illustrated example, the first tie 338 is disposed on a first side 342 of the bimorph actuator 300, and the second tie 340 is disposed on a second side 344 of the bimorph actuator 300. In the illustrated example, the first tie 338 is coupled to the second tie 340 via a fastener 345 (e.g., a bolt) to clamp the bimorph actuator 300 between the first tie 338 and the second tie 340. Thus, when the example first bimorph beam 302 and the example second bimorph beam 304 bend or deflect, the first tie 338 and the second tie 340 move with the first bimorph beam 302 and the second bimorph beam 304.

The example bell crank 334 is coupled to the first tie 338 and/or the second tie 340 via an arm 346. In some examples, the arm 346 is a wire or cable. In the illustrated example, the arm 346 couples the bell crank 334 to the first tie 338 and/or the second tie 340 by extending from an end 348 of the fastener 345 to the bell crank 334 via a second slot 350 defined by the base 310. In other examples, the arm 346 is implemented in other ways.

Figure 6:
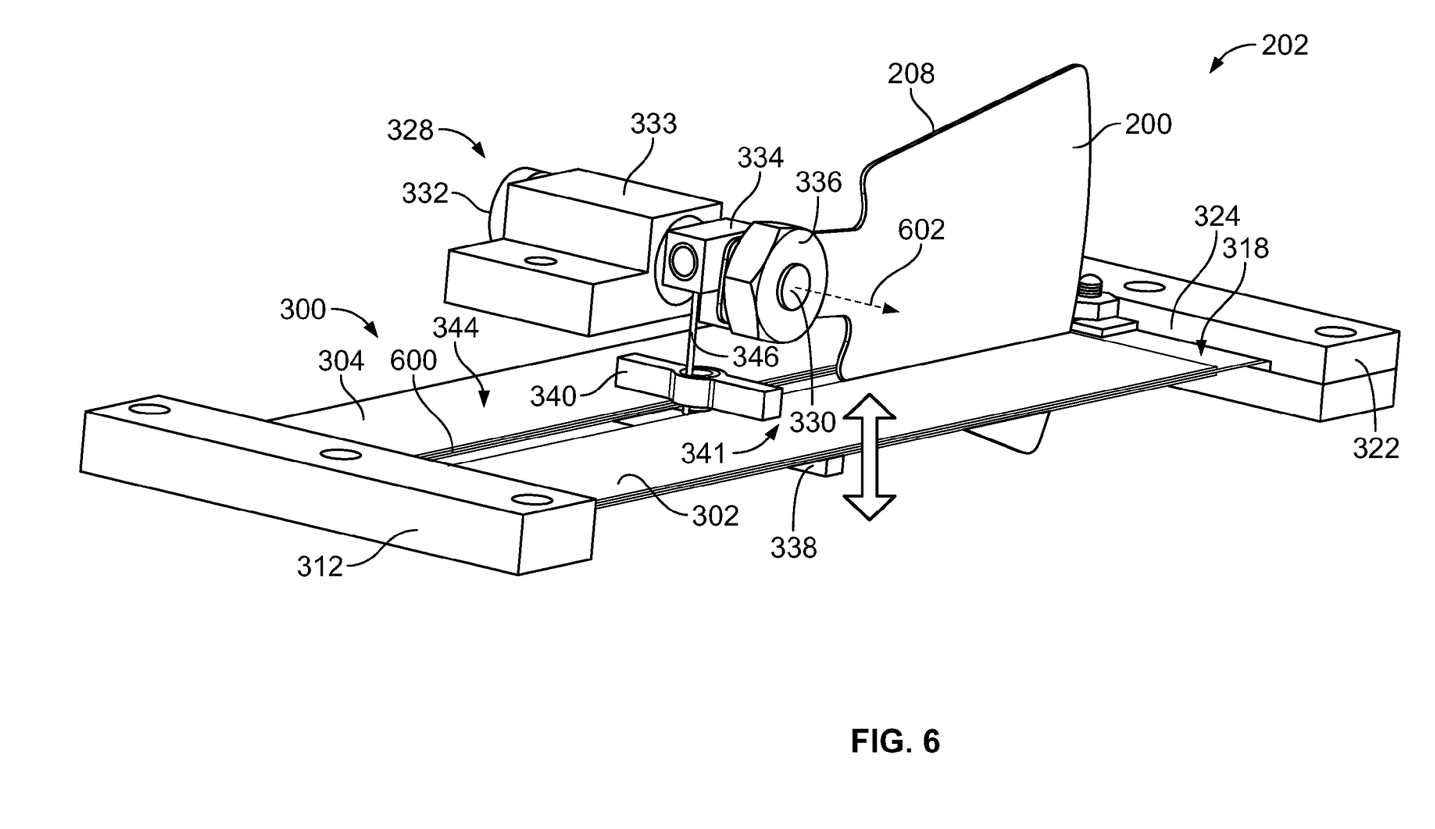
FIG. 6 is a perspective, cutaway view of the example vortex generator of FIG. 2-5.
Figure 7:
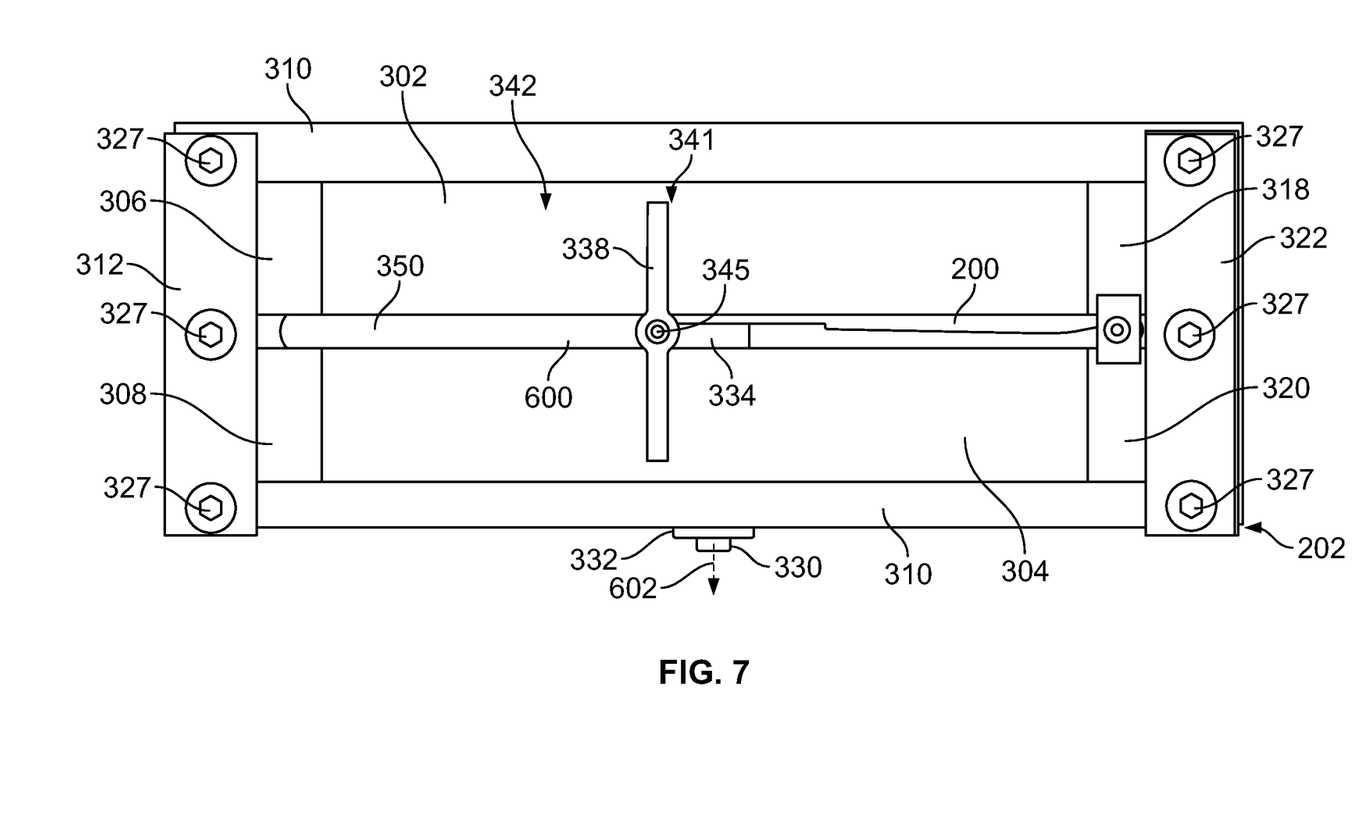
FIG. 7 is a top view of the example vortex generator of FIG. 6.

FIGS. 6-7 illustrate the example vortex generator 202 of FIGS. 2-5. FIG. 6 is a perspective view of the example vortex generator 202 shown inverted relative to the orientation of the vortex generator 202 in FIGS. 3-5. FIG. 7 is a bottom view of the example vortex generator 202 of FIG. 6. In the illustrated example, the first bimorph beam 302 and the second bimorph beam 304 are spaced apart to define a space or third slot 600 between the first bimorph beam 302 and the second bimorph beam 304. In the illustrated example, the first tie 338 and the second tie 340 extend across and/or span the third slot 600. In the illustrated example, a portion of the blade 200 is disposed in the third slot 600.

In the illustrated example, when the bimorph actuator 300 is energized, the middle portion 341 of the bimorph actuator 300 bends or deflects away from the bell crank 334 and the first wing 102 (FIGS. 1-5). In some examples, a maximum amount of deflection of the first bimorph beam 302 and/or the second bimorph beam 304 is two millimeters. In other examples, the bimorph actuator 300 bends or deflects other amounts. The first tie 338 and the second tie 340 move with the bimorph actuator 300 and drive the arm 346 to rotate the bell crank 334 about an axis of rotation 602 defined by the shaft 330. As a result, the example blade 200 rotates about the axis of rotation 602 from the retracted position (FIG. 2) to the deployed position (FIG. 7). In the illustrated example, when the bimorph actuator 300 bends or deflects, the second ends 318, 320 of the first bimorph beam 302 and the second bimorph beam 304 slide within the first channel 324 and the second channel 326, respectively. The example blade 200 in the deployed position generates a vortex in the fluid flowing adjacent the surface 204. In some examples, the bimorph actuator 300 is actuated to move between the retracted position and the deployed position at a predetermined frequency to generate an oscillatory stream of vortexes in a boundary layer of the fluid flowing adjacent the surface 204 of the first wing 102.

Figure 8:
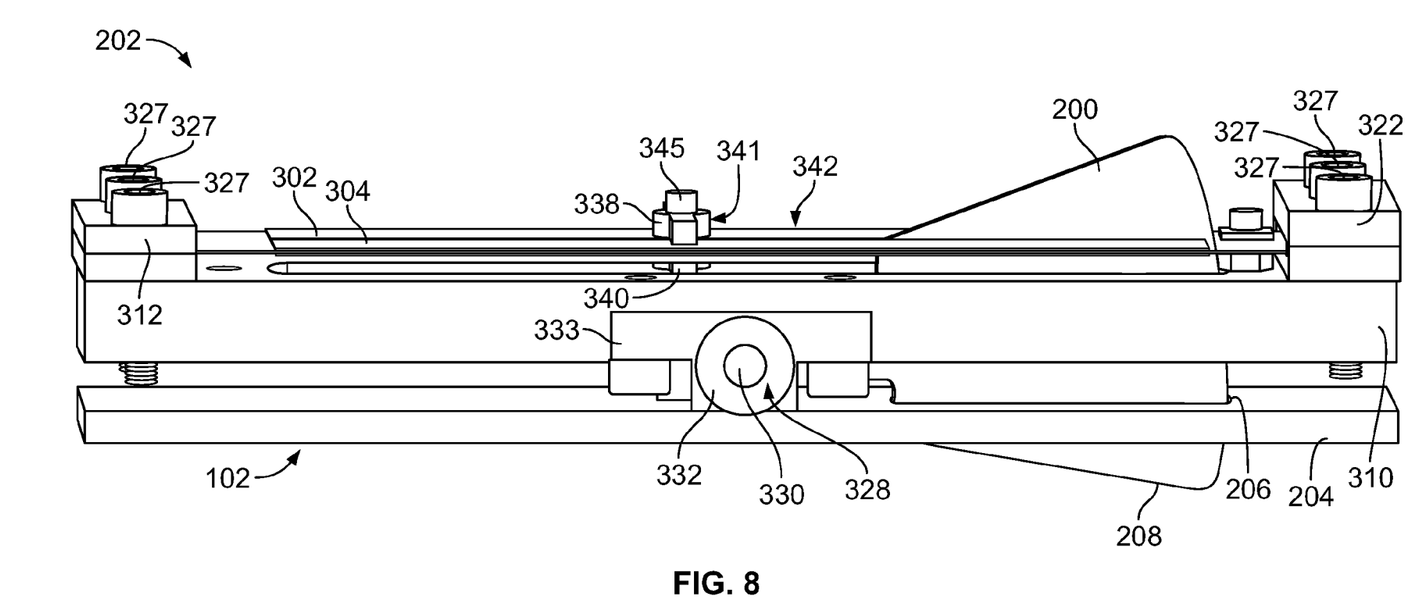
FIG. 8 is a side view of the example vortex generator of FIGS. 2-6, illustrating the blade in a deployed position.
Figure 9:
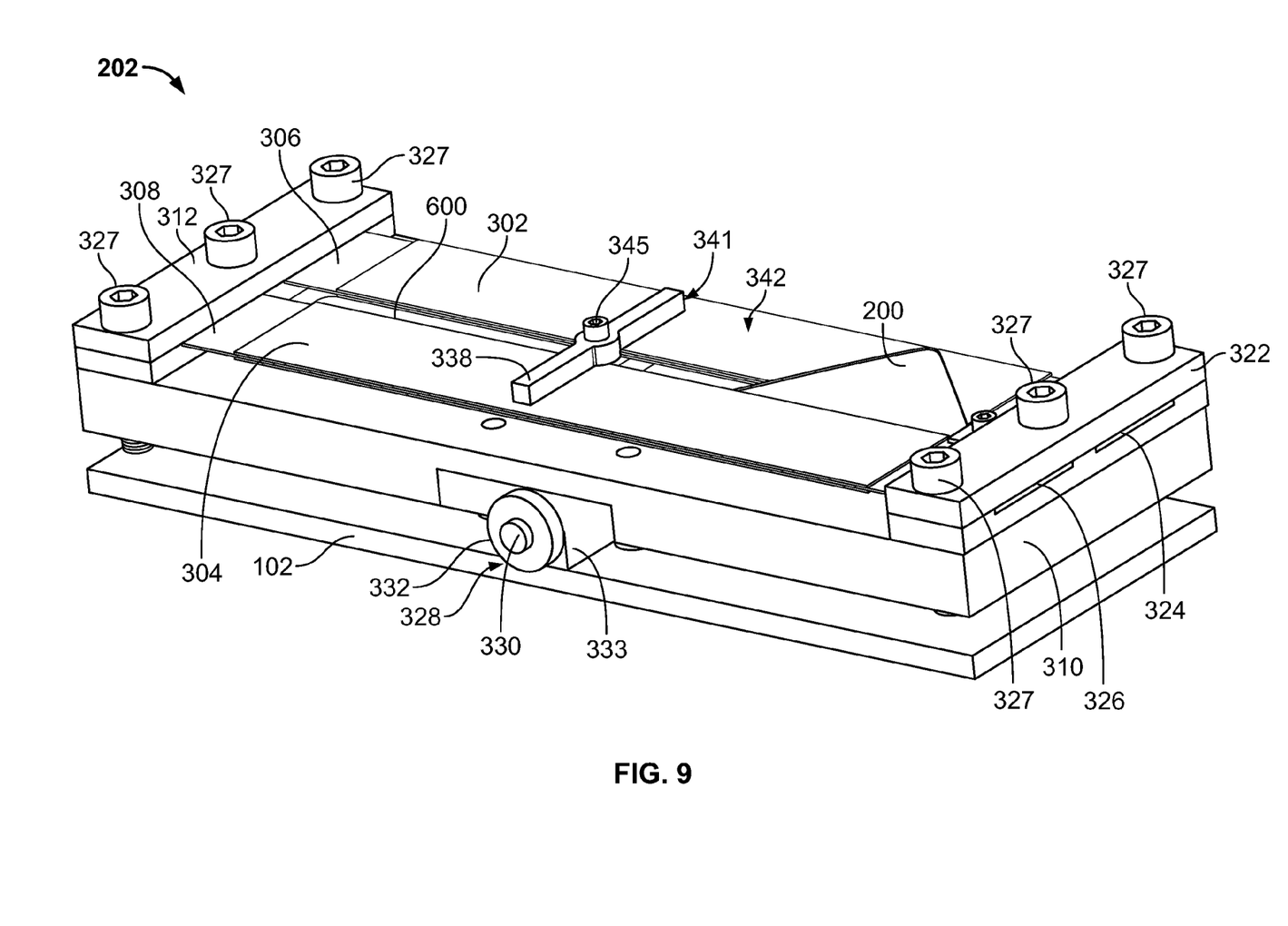
FIG. 9 is a perspective view of the example vortex generator of FIGS. 2-8.

FIGS. 8-9 illustrate the example vortex generator 202 of FIGS. 2-7 having the example blade 200 in the deployed position. FIG. 8 is a side, cutaway view of the example vortex generator 202. FIG. 9 is a perspective view of the example vortex generator 202. The example blade 200 in the deployed position substantially fills the first slot 206. In the illustrated example, when the blade 200 is in the deployed position, the first edge 208 of the blade is in a second orientation. In the illustrated example, the blade 200 is angled approximately fifteen degrees away from a direction of flow of the fluid adjacent the surface 204. In other examples, the blade 200 and/or the first edge 208 are oriented in other ways. The example blade 200 of FIGS. 8-9 extends into and/or through the boundary layer of the fluid flowing adjacent the surface 204 of the first wing 102 to generate vortexes in the fluid. When the example blade 200 generates vortexes, the vortexes draw fluid from outside the boundary layer of the fluid toward the surface 204. As a result, separated flow is reattached and/or flow separation is reduced and/or delayed, improving an aerodynamic performance of the aircraft 100. For example, drag on the aircraft 100 may be decreased, stall phenomena affecting the aircraft 100 may be mitigated, and/or the aerodynamic performance of the aircraft 100 may be improved in other ways.

Figure 10:
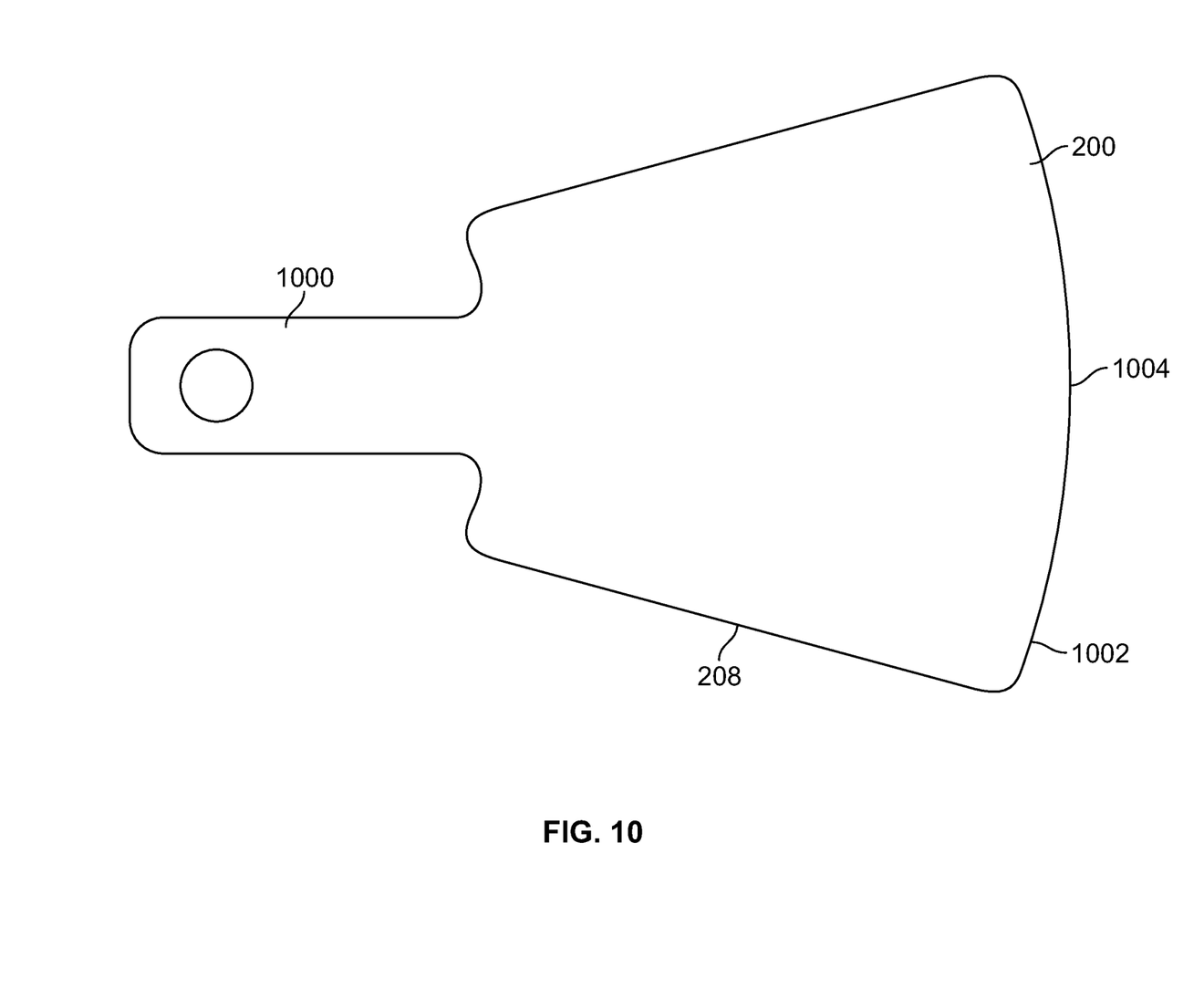
FIG. 10 is a side view of the example blade of the example vortex generator of FIGS. 2-9.

FIG. 10 is a side view of the example blade 200 of FIGS. 2-9. In the illustrated example, the blade 200 includes a flange 1000. The example blade 200 couples to the crank assembly 328 via the flange 1000. In the illustrated example, the first edge 208 is disposed at an angle (e.g., fifteen degrees) relative to the flange 1000. The example first edge 208 of FIG. 10 is substantially planar. In other examples, the first edge 208 is not planar. For example, the first edge 208 may be curved. In the illustrated example, the blade includes a second edge 1002 defining an end 1004 of the blade 200. In the illustrated example, the second edge 1002 is curved. In other examples, the second edge 1002 is other shapes (e.g., planar). The above-noted shapes of the blade 200 are merely examples. In other examples, the blade 200 is other shapes. For example, the blade may be a shape described in U.S. Pat. No. 8,047,233, which was filed on Nov. 14, 2007, entitled "Apparatus and Method for Generating Vortexes in Fluid Flow Adjacent to a Surface," which is hereby incorporated herein by reference in its entirety and/or any other shape.

Figure 11:
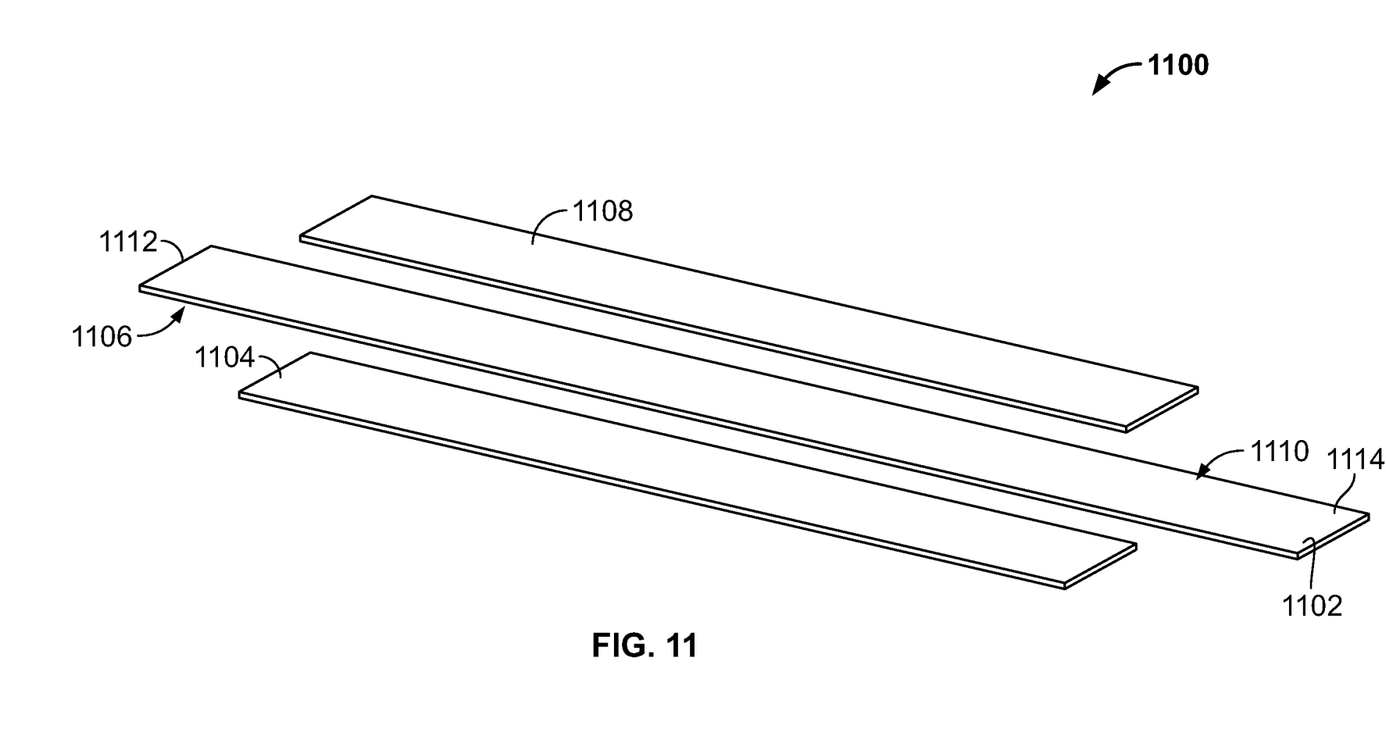
FIG. 11 is an exploded view of an example bimorph beam constructed in accordance with the teachings of this disclosure.

FIG. 11 illustrates an example bimorph beam 1100, which may be used to implement the example first bimorph beam 302 and/or the example second bimorph beam 304 of the example bimorph actuator 300 of FIGS. 3-9. In the illustrated example, the bimorph beam 1100 includes a flexible substrate sheet 1102 having a first length. In some examples, the substrate sheet 1102 is a uniaxial prepreg carbon sheet. A first piezoelectric wafer 1104 is coupled to a first side 1106 of the example substrate sheet 1102. A second piezoelectric wafer 1108 is coupled to a second side 1110 of the example substrate sheet 1102. In some examples, the first piezoelectric wafer 1104 and/or the second piezoelectric wafer 1108 have thicknesses between 0.13 millimeters and 0.5 millimeters. In other examples, the first piezoelectric wafer 1104 and/or the second piezoelectric wafer 1108 have other thicknesses. In the illustrated example, the first piezoelectric wafer 1104 and the second piezoelectric wafer 1108 have a second length shorter than the first length and are substantially centrally located on the substrate sheet 1102. As a result, a first end 1112 and a second end 1114 of the substrate sheet 1102 are not covered by the first piezoelectric wafer 1104 and/or the second piezoelectric wafer 1108. In some examples, the bimorph beam 1100 is supported via the first end 1112 and the second end 1114 of the substrate sheet 1102. As a result, when the example bimorph beam 1100 bends, the first end 1112 and/or the second end 1114 may rotate and, thus, function as pivot points and/or hinges.

When an electrical signal is supplied to the example bimorph beam 1100, the bimorph beam 1100 bends or deflects. In some examples, a first voltage having a first polarity is applied to the first piezoelectric wafer 1104 and a second voltage having a second polarity is applied to the second piezoelectric wafer 1108. As a result, the first piezoelectric wafer 1104 elongates and the second piezoelectric wafer 1108 shortens. When the first piezoelectric wafer 1104 elongates and the second piezoelectric wafer 1108 shortens, the example bimorph beam 1100 bends or deflects. In some examples, a maximum amount of deflection of the bimorph beam 1100 is two millimeters. In other examples, the bimorph beam 1100 deflects other amounts. In some examples, polarities of the first voltage and the second voltage are cyclically alternated or switched to cause the bimorph beam 1100 to oscillate between a first position and a second position. In some examples, the bimorph beam 1100 is constructed and/or operated in accordance with the teachings of U.S. Pat. No. 7,681,290, filed Oct. 20, 2006, entitled "Piezoelectric Bimorph Beam Manufacturing Method," which is hereby incorporated herein by reference in its entirety. In other examples, the bimorph beam 1100 is constructed and/or operated in other ways.

From the foregoing, it will be appreciated that the above disclosed vortex generators generate vortexes in fluid flowing adjacent to a surface. The example vortex generators disclosed herein include blades that are deployed through slots in the surface to extend into and/or through a boundary layer of the fluid. When the generation of vortexes in the fluid is not desired, the blades of the example vortex generators disclosed herein may be retracted to be substantially flush with the surface such that the example vortex generators produce substantially no additional and/or collateral drag on the surface. The example blades substantially fill the slots when the blades are in a retracted position, when the blades are in a deployed position and when the blades are positioned and/or moving between the retracted position and the deployed position. As a result, the example vortex generators disclosed herein are less susceptible to an incursion of debris such as ice, dirt, etc. than traditional dynamic vortex generators.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a housing including a surface;
a bimorph actuator disposed in the housing, the bimorph actuator including a first bimorph beam and a second bimorph beam spaced apart from the first bimorph beam, the first bimorph beam having a first portion fixed relative to the surface; and
a blade rotatably coupled to the bimorph actuator, the bimorph actuator to rotate the blade to extend a portion of the blade through the surface to generate a vortex in a fluid flowing past the surface, wherein the blade is disposed in a space between the first bimorph beam and the second bimorph beam when the blade is in a retracted position.

2. The apparatus of claim 1 further comprising a tie coupled to the first bimorph beam and the second bimorph beam, deflection of the first bimorph beam and the second bimorph beam to move the tie.

3. The apparatus of claim 2 further comprising an arm coupled to the tie and the blade, wherein movement of the tie is to drive the arm to rotate the blade.

4. The apparatus of claim 3 further comprising a crank operatively coupled to the arm and the blade, wherein movement of the arm is to rotate the crank and the blade.

5. The apparatus of claim 1, wherein an edge of the blade is substantially flush with the surface when the blade is in the retracted position.

6. An apparatus comprising:
a housing including a surface;
a bimorph actuator disposed in the housing, the bimorph actuator including a first bimorph beam having a first portion fixed relative to the surface, wherein the first portion is fixedly coupled to a base, and a second portion of the first bimorph beam is slidably coupled to the base; and
a blade rotatably coupled to the bimorph actuator, the bimorph actuator to rotate the blade to extend a portion of the blade through the surface to generate a vortex in a fluid flowing past the surface.

7. The apparatus of claim 6, wherein the blade substantially fills a slot extending through the surface.

8. An apparatus comprising:
a blade; and
a bimorph actuator operatively coupled to the blade, the bimorph actuator including a fixed portion and a movable portion to enable deflection of the bimorph actuator to rotate the blade, the blade in a first position to define a portion of a surface, the blade in a second position to generate a vortex in a fluid adjacent the surface, wherein the movable portion of the bimorph actuator is disposed in a slot defined by a base, the slot to guide translational movement of the moveable portion of the bimorph actuator.

9. The apparatus of claim 8, wherein the fixed portion of the bimorph actuator is fixedly coupled to the base.

10. The apparatus of claim 8, wherein the surface defines an aperture, the blade to be disposed in the aperture when the blade is in the first position and the second position.

11. The apparatus of claim 10, wherein a shape of an edge of the blade corresponds to a shape of the surface.

12. The apparatus of claim 8, wherein the blade is to extend through the surface to the second position when the bimorph actuator deflects away from the surface.

13. An apparatus, comprising:
   a bimorph actuator disposed in a housing defining a surface, the bimorph actuator having a first portion substantially stationary relative to the surface and a second portion slidably coupled to the surface; and
   a blade operatively coupled to the bimorph actuator, deflection of the bimorph actuator to extend or retract the blade relative to the surface, an edge of the blade to be in a first orientation relative to the surface when the blade is retracted, the edge of the blade to be in a second orientation relative to the surface when the blade is deployed.

14. The apparatus of claim 13, wherein the edge in the first orientation is substantially flush with the surface.

15. The apparatus of claim 13, wherein the edge in the second orientation is to be angled away from the surface.

16. The apparatus of claim 13, wherein a maximum amount of the deflection of the bimorph actuator is to occur at a middle portion of the bimorph actuator.

17. The apparatus of claim 13, wherein the blade is to rotate relative to the surface to extend or retract the blade.

* * * * *